(12) United States Patent
Takemori et al.

(10) Patent No.: US 11,265,170 B2
(45) Date of Patent: Mar. 1, 2022

(54) VEHICLE INFORMATION COLLECTION SYSTEM, VEHICLE-MOUNTED COMPUTER, VEHICLE INFORMATION COLLECTION DEVICE, VEHICLE INFORMATION COLLECTION METHOD, AND COMPUTER PROGRAM

(71) Applicant: KDDI CORPORATION, Tokyo (JP)

(72) Inventors: Keisuke Takemori, Tokyo (JP); Seiichiro Mizoguchi, Tokyo (JP); Hideaki Kawabata, Tokyo (JP); Ayumu Kubota, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 79 days.

(21) Appl. No.: 16/307,045

(22) PCT Filed: Aug. 28, 2017

(86) PCT No.: PCT/JP2017/030704
§ 371 (c)(1),
(2) Date: Dec. 4, 2018

(87) PCT Pub. No.: WO2018/043386
PCT Pub. Date: Mar. 8, 2018

(65) Prior Publication Data
US 2019/0222423 A1 Jul. 18, 2019

(30) Foreign Application Priority Data
Aug. 29, 2016 (JP) .............................. JP2016-167274

(51) Int. Cl.
*H04L 29/06* (2006.01)
*H04L 9/32* (2006.01)
(Continued)

(52) U.S. Cl.
CPC ............ *H04L 9/3242* (2013.01); *G07C 5/008* (2013.01); *G07C 5/085* (2013.01); *G09C 1/00* (2013.01);
(Continued)

(58) Field of Classification Search
CPC ... H04L 9/3242; H04L 9/0861; H04L 63/123; H04L 63/0823; H04L 2209/127;
(Continued)

(56) References Cited

U.S. PATENT DOCUMENTS 9,276,737 B2 3/2016 Peirce
2007/0172256 A1 7/2007 Iwamura
(Continued)

FOREIGN PATENT DOCUMENTS

CN 103763335 A 4/2014
CN 104890623 A 9/2015
(Continued)

OTHER PUBLICATIONS

Search Report issued in European Patent Office (EPO) Patent Application No. 17846391.5, dated Mar. 30, 2020.
(Continued)

*Primary Examiner* — Michael Simitoski
*Assistant Examiner* — Andrew Suh
(74) *Attorney, Agent, or Firm* — Greenblum & Bernstein, P.L.C.

(57) ABSTRACT

An in-vehicle computer generates a message authentication code about its own log using its own signature key and thereby transmits a log annotated with its message authentication code to a vehicle information collection device. The vehicle information collection device generates the signature key of the in-vehicle computer, verifies the message authentication code, which is included in the log annotated with its message authentication code received from the
(Continued)

US 11,265,170 B2

Page 2 in-vehicle computer, using generated signature key, and thereby stores the log relating to the successfully verified message authentication code on storage media.

4 Claims, 4 Drawing Sheets

(51) Int. Cl.
   *G09C 1/00* (2006.01)
   *H04W 4/48* (2018.01)
   *H04L 9/08* (2006.01)
   *H04W 12/041* (2021.01)
   *H04W 12/106* (2021.01)
   *G07C 5/00* (2006.01)
   *G07C 5/08* (2006.01)

(52) U.S. Cl.
   CPC .......... *H04L 9/0822* (2013.01); *H04L 9/0861* (2013.01); *H04L 63/123* (2013.01); *H04W 4/48* (2018.02); *H04W 12/041* (2021.01); *H04W 12/106* (2021.01); *H04L 63/0823* (2013.01); *H04L 2209/127* (2013.01); *H04L 2209/84* (2013.01)

(58) Field of Classification Search
   CPC ... H04L 2209/84; H04L 9/0822; G06F 21/31; H04W 4/48; H04W 12/106; H04W 12/041; G07C 5/008; G07C 5/085; G09C 1/00
   See application file for complete search history.

(56) References Cited

U.S. PATENT DOCUMENTS

| | | | |
|---|---|---|---|
| 2015/0033039 A1* | 1/2015 | Basmov | G06F 3/0673 713/193 |
| 2015/0180655 A1* | 6/2015 | Wei | H04L 9/0894 713/189 |
| 2015/0180661 A1* | 6/2015 | Fujii | H04L 9/30 380/46 |
| 2016/0035147 A1 | 2/2016 | Huang | |
| 2016/0297401 A1 | 10/2016 | Haga et al. | |
| 2018/0025149 A1* | 1/2018 | Watson | B60R 16/037 726/2 |
| 2019/0007215 A1* | 1/2019 | Hakuta | H04W 12/06 |
| 2019/0028267 A1* | 1/2019 | Takemori | H04L 9/0877 |

FOREIGN PATENT DOCUMENTS

| | | |
|---|---|---|
| CN | 104935434 A | 9/2015 |
| EP | 3 142 291 A1 | 3/2017 |
| JP | 2005-510813 A | 4/2005 |
| JP | 2006-237860 A | 9/2006 |
| JP | 2008-181410 A | 8/2008 |
| JP | 2014-204444 A | 10/2014 |
| JP | 2014-220803 A | 11/2014 |
| JP | 2016-111589 A | 6/2016 |
| WO | 03/046838 A1 | 6/2003 |
| WO | 2015/170453 A1 | 11/2015 |

OTHER PUBLICATIONS

Richard Petri et al: "Evaluation of lightweight TPMs for automotive software updates over the air: Paper presented at 4th escar USA, The World's Leading Automotive Cyber Security Conference, Detroit, MI, Jun. 1-2, 2016", Jan. 1, 2016 (Jan. 1, 2016), XP55674768, Retrieved from the Internet: http://ftp.pwg.org/pub/pwg/liaison/escar/tpm_paper_2016_0513_final.pdf.

Takemori et al: "Automotive Security—Using Secure Element", Automotive Security—Using Secure Element, IEEE, JP, [Online] Dec. 16, 2015 (Dec. 16, 2015), pp. 1-27, XP009512603, Retrieved from the Internet: https://www.ieee-jp.org/section/tokyo/chapter/ITS-38/pdf/20151107icves2015keynote3.

Masashi Eto Nict Japan: "Report of editorial meeting of X.itssec-1;TD 2176" Itu-T Draft ; Study Period 2013-2016, International Telecommunication Union, Geneva ; CH, vol. 6/17, Sep. 15, 2015 (Sep. 15, 2015), pp. 1-55, XP044150731.

Keisuke Takemori et al: "In-Vehicle Network Security Using Secure Element", IEICE Transactions on Fundamentals of Electronics,Communications and Computer Sciences., vol. E99.A, No. 1, Jan. 1, 2016 (Jan. 1, 2016), pp. 208-216, XP055537638, JP ISSN: 0916-8508, DOI: 10.1587/transfun.E99.A.208.

Takemori, "In-vehicle Network Security Using Secure Elements—Discussion of Security Technologies—", IEICE Technical Report, vol. 114, No. 508, Mar. 2015, pp. 73-78.

AN4240 Application note, "Introduction to the Cryptographic Service Engine (CSE) module for SPC56ECxx and SPC564Bxx devices" STMicroelectronics, http://www.st.com/web/en/resource/technical/document/application_note/DM0075575.pdf , Aug. 22, 2016.

Notice of Reasons for Rejection issued in Japanese family member Appl. No. 2016-167274, dated May 30, 2017, along with an English translation thereof.

International Search issued in International Bureau of WIPO Patent Application No. PCT/JP2017/030704, dated Sep. 26, 2017, along with an English translation thereof.

CN Office Action, dated Nov. 18, 2020, in Chinese Patent Application No. 201780034845.4, with Partial English Language Translation (Search Report).

CN Second Office Action, dated May 19, 2021, in Chinese Patent Application No. 201780034845.4, with English Language Translation.

"IPSec Security Protocol", edited by Jiang Chaohui, "Information Security Principles and Technology", China Railway Publishing House, Published May 31, 2009, Section 2.2.3, (English Language concise explanation of relevance provided in CN Second Office Action, dated May 19, 2021, in Chinese Patent Application No. 201780034845.4).

* cited by examiner

VEHICLE INFORMATION COLLECTION SYSTEM, VEHICLE-MOUNTED COMPUTER, VEHICLE INFORMATION COLLECTION DEVICE, VEHICLE INFORMATION COLLECTION METHOD, AND COMPUTER PROGRAM

TECHNICAL FIELD

The present invention relates to a vehicle information collection system, an in-vehicle computer, a vehicle information collection device, a vehicle information collection method, and a computer program.

The present application claims the benefit of priority on Japanese Patent Application No. 2016-167274 filed on Aug. 29, 2016, the subject matter of which is hereby incorporated herein by reference.

BACKGROUND ART

Conventionally, automobiles have been equipped with ECUs (Electronic Control Units) to achieve functions such as engine control functions. Herein, ECUs are one type of computers to achieve desired functions using computer programs. For example. Non-Patent Literature Document 1 discloses a security technology about an in-vehicle control system in which multiple ECUs are connected together through a CAN (Controller Area Network).

CITATION LIST

Non-Patent Literature Document

Non-Patent Literature Document 1: Keisuke TAKEMORI, "Protection of In-Vehicle Control System Using Secure Elements—Organization and Study of Elementary Technology—"The Institute of Electronics, Information and Communication Engineers, Shingaku-Giho, Vol. 114, No. 508, pp. 73-78, March 2015

Non-Patent Literature Document 2: STMicroelectronics, "AN4240 Application note", [Retrieved on Aug. 22, 2016], the Internet <URL: http://wwwst.com/web/en/resource/technical/document/application_note/DM00075575.pdf>

SUMMARY OF INVENTION

Technical Problem

One problem here is to safely collect logs of ECUs in an in-vehicle control system of an automobile.

The present invention is made in consideration of the aforementioned circumstances, and therefore, the present invention aims to provide a vehicle information collection system, an in-vehicle computer, a vehicle information collection device, a vehicle information collection method, and a computer program, which are configured to safely collect logs of in-vehicle computers such as ECUs.

Solution to Problem (1) According to one aspect of the invention, a vehicle information collection system includes a vehicle information collection device and an in-vehicle computer mounted on a vehicle. The in-vehicle computer further includes an interface configured to receive or transmit data from or to an external device outside the in-vehicle computer, and an encryption processor configured to generate a message authentication code about a log of the in-vehicle computer using a signature key of the in-vehicle computer, wherein the log annotated with the message authentication code is transmitted to the vehicle information collection device via the interface. The vehicle information collection device further includes a vehicle interface configured to receive or transmit data from or to the vehicle, a key generator configured to generate the signature key of the in-vehicle computer, an encryption processor configured to verify the message authentication code, which is included in log annotated with the message authentication code received from the in-vehicle computer via the vehicle interface, using the signature key of the in-vehicle computer generated by the key generator, and a storage media configured to store the log relating to the successfully verified message authentication code.

(2) According to one aspect of the invention, in the vehicle information collection system according to (1), the encryption processor of the in-vehicle computer encrypts the log of the in-vehicle computer using an encryption key of the in-vehicle computer and thereby transmits an encrypted log annotated with its message authentication code to the vehicle information collection device via the interface unit. The key generator generates the encryption key of the in-vehicle computer. The encryption processor of the vehicle information collection device decrypts the encrypted log annotated with its message authentication code, which is received from the in-vehicle computer via the vehicle interface, using the encryption key of the in-vehicle computer generated by the key generator.

(3) According to one aspect of the invention, in the vehicle information collection system according to (2), the encryption processor of the in-vehicle computer generates the encrypted log annotated with the message authentication code using the signature key of the in-vehicle computer.

(4) According to one aspect of the invention, an in-vehicle computer mounted on a vehicle includes an interface configured to receive or transmit data from or to an external device outside the in-vehicle computer; and an encryption processor configured to generate a message authentication code about a log of the in-vehicle computer using a signature key of the in-vehicle computer. The log annotated with its message authentication code is transmitted to a vehicle information collection device via the interface.

(5) According to one aspect of the invention, a vehicle information collection device includes a vehicle interface configured to receive or transmit data from or to a vehicle; a key generator configured to generate a signature key of an in-vehicle computer mounted on the vehicle; an encryption processor configured to verify a message authentication code, which is included in a log annotated with its message authentication code received from the in-vehicle computer via the vehicle interface, using the signature key of the in-vehicle computer generated by the key generator; and a storage media configured to store the log relating to the successfully verified message authentication code.

(6) According to one aspect of the invention, a vehicle information collection method includes a signature generating step causing an in-vehicle computer mounted on a vehicle to generate a message authentication code about a log of the in-vehicle computer using a signature key of the in-vehicle computer; a transmission step causing the in-vehicle computer to transmit the log annotated with its message authentication code to a vehicle information collection device via an interface configured to receive or transmit data from or to an external device outside the in-vehicle computer; a key generating step causing the vehicle information collection device to generate the signature key of the in-vehicle computer; a signature verifying step causing the vehicle information collection device to verify the message authentication code, which is included in the log annotated with its message authentication code received from the in-vehicle computer via a vehicle interface configured to receive or transmit data with the vehicle, using the signature key of the in-vehicle computer generated in the key generating step; and a log storing step causing the vehicle information collection device to store the log relating to the successfully verified message authentication code on a storage media.

(7) According to one aspect of the invention, a computer program causes an in-vehicle computer to implement: an encryption processing function configured to encrypt a message authentication code about a log of the in-vehicle computer using a signature key of the in-vehicle computer; and a transmission function configured to transmit the log annotated with its message authentication code to a vehicle information collection device via an interface configured to receive or transmit data from or to an external device outside the in-vehicle computer.

(8) According to one aspect of the invention, a computer program causes a computer of a vehicle information collection device, which is equipped with a vehicle interface configured to receive or transmit data from or to a vehicle, to implement: a key generating function configured to generate a signature key of an in-vehicle computer mounted on the vehicle; an encryption processing function configured to verify a message authentication code, which is included in a log annotated with its message authentication code received from the in-vehicle computer via the vehicle interface, using the signature key of the in-vehicle computer generated by the key generating function; and a log storing function configured to store the log relating to the successfully verified message authentication code.

Advantageous Effects of Invention

According to the present invention, it is possible to obtain an effect of safely collecting logs of in-vehicle computers such as ECUs.

DESCRIPTION OF EMBODIMENT

Hereinafter, one embodiment of the present invention will be described with reference to the drawings. The embodiment herein refers to an automobile as an example of a vehicle.

Figure 1:
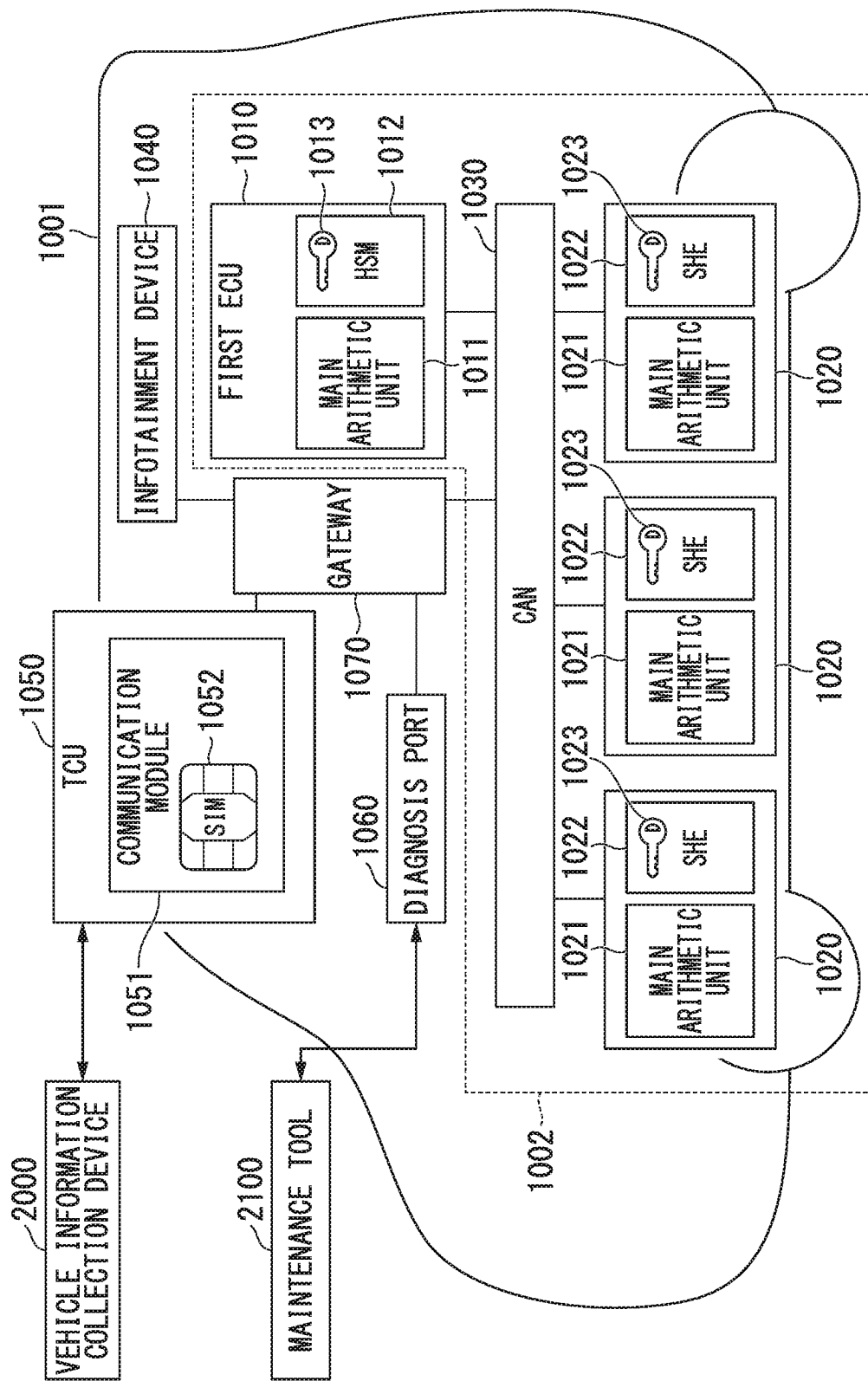
FIG. 1 is a block diagram showing a configuration example of a vehicle information collection system and an automobile according to one embodiment.

FIG. 1 is a block diagram showing a configuration example of a vehicle information collection system and an automobile 1001 according to one embodiment. The present embodiment refers to an ECU (Electronic Control Unit) installed in the automobile 1001 as one example of in-vehicle computers.

In FIG. 1, the automobile 1001 includes a first ECU 1010 and multiple second ECUs 1020. Both the first ECU 1010 and the second ECU 1020 are in-vehicle computers mounted on the automobile 1001. For example, the first ECU 1010 has a security function to secure data applied to the second ECUs 1020 mounted on the automobile 1001. The second ECU 1020 has a control function to control an engine or the like. As the second ECUs 1020, it is possible to mention an ECU having an engine control function, an ECU having a handle control function, and an ECU having a brake control function.

In the following descriptions, both the first ECU 1010 and the second ECU 1020 will be simply referred to as ECUs when they are not discriminated from each other.

The first ECU 1010 and the second ECUs 1020 are connected to a CAN (Controller Area Network) 1030 installed in the automobile 1001. The CAN 1030 is a communication network. Herein, CANs are known as one type of communication networks installed in vehicles. The first ECU 1010 exchanges data with each of the second ECUs 1020 through the CAN 1030. The second ECU 1020 exchanges data with other second ECUs 1020 through the CAN 1030.

As communication networks installed in a vehicle, it is possible to install a different communication network than a CAN in the automobile 1001, and therefore, it is possible to exchange data between the first ECU 1010 and the second ECU 1020 or to exchange data between the second ECUs 1020 through a different communication network than a CAN. For example, it is possible to install a LIN (Local Interconnect Network) in the automobile 1001. Alternatively, it is possible to install both a CAN and a LIN in the automobile 1001. In addition, it is possible to mount the second ECU 1020 connectible to a LIN on the automobile 1001.

The first ECU 1010 may be connected to both a CAN and a LIN. In this connection, the first ECU 1010 may exchange data with the second ECU 1020 connected to a CAN through a CAN while the first ECU 1010 may exchange data with the second ECU 1020 connected to a LIN through a LIN. Alternatively, the second ECUs 1020 may mutually exchange data therewith via a LIN.

The automobile 1001 is equipped with an in-vehicle computer system 1002 in which the first ECU 1010 and the second ECUs 1020 are connected to the CAN 1030. In the present embodiment, the in-vehicle computer system 1002 may serve as an in-vehicle control system of the automobile 1001.

A gateway 1070 is configured to monitor communications exchanged between the inside and the outside of the in-vehicle computer system 1002. The gateway 1070 is connected to the CAN 1030. In addition, the gateway 1070 is connected to an infotainment device 1040, a TCU (Tele-Communication Unit) 1050, and a diagnosis port 1060, which exemplify external devices connected to the in-vehicle computer system 1002. Herein, ECUs carry out communications with external devices connected to the in-vehicle computer system 1002 through the gateway 1070.

As one configuration of the CAN 1030, the CAN 1030 may include multiple buses (or communication lines) which can be connected to the gateway 1070. In this case, one second ECU 1020 or multiple second ECUs 1020 are connected to a single bus. In addition, it is possible to connect the first ECU 1010 and the second ECU 1020 to the same bus. Alternatively, it is possible to separate one bus connected to the first ECU 1010 and another bus connected to the second ECU 1020.

The automobile 1001 includes the diagnosis port 1060. As the diagnosis port 1060, for example, it is possible to use an OBD (On-Board Diagnostics) port. Any external devices outside the automobile 1001 are connectible to the diagnosis port 1060. As external devices connectible to the diagnosis port 1060 outside the automobile 1001, for example, it is possible to mention a maintenance tool 2100 shown in FIG. 1 or the like. An external device connected to the diagnosis port 1060, e.g. the maintenance tool 2100, is configured to communicate with ECUs connected to the CAN 1030. The maintenance tool 2100 may have a function as a conventional diagnosis terminal connectible to an OBD port.

The automobile 1001 includes the infotainment device 1040. As the infotainment device 1040, for example, it is possible to mention various types of devices having a navigation function, a position information service function, a multimedia playback function for playing back music and moving pictures, a speech communication function, a data communication function, an Internet-connecting function, and the like.

The automobile 1001 includes the TCU 1050. The TCU 1050 is a communication device. The TCU 1050 includes a communication module 1051. The communication module 1051 carries out wireless communication using a wireless communication network. The communication module 1051 includes an SIM (Subscriber Identity Module) 1052. The SIM 1052 is an SIM which the information for accessing a wireless communication network is written into. The communication module 1051 can be connected to a wireless communication network using the SIM 1052, thus implementing wireless communication. As the SIM 1052, it is possible to use an eSIM (Embedded Subscriber Identity Module).

The ECU exchanges data with the TCU 1050 through the gateway 1070.

According to another connection manner for the TCU 1050, for example, it is possible to connect the TCU 1050 to the infotainment device 1040 such that an ECU can exchange data with the TCU 1050 through the gateway 1070 and the infotainment device 1040. Alternatively, it is possible to connect the TCU 1050 to the diagnosis port 1060 such that an ECU can exchange data with the TCU 1050 connected to the diagnosis port 1060 through the gateway 1070 and the diagnosis port 1060. In addition, the first ECU 1010 may include the communication module 1051 including the SIM 1052. That is, the automobile 1001 may not necessarily include the TCU 1050 when the first ECU 1010 includes the communication module 1051 including the SIM 1052. Alternatively, the infotainment device 1040 may include the communication module 1051 including the SIM 1052. That is, the automobile 1001 may not necessarily include the TCU 1050 when the infotainment device 1040 includes the communication module 1051 including the SIM 1052.

The first ECU 1010 includes a main arithmetic unit 1011 and an HSM (Hardware Security Module) 1012. The main arithmetic unit 1011 executes computer programs to achieve the function of the first ECU 1010. The HSM 1012 has an encryption processing function or the like. The HSM 1012 has a tamper-resistant property. The HSM 1012 is an example of a secure element (SE). The HSM 1012 includes a storage media 1013 configured to store data. The main arithmetic unit 1011 uses the HSM 1012.

The second ECU 1020 includes a main arithmetic unit 1021 and a SHE (Secure Hardware Extension) 1022. The main arithmetic unit 1021 executes computer programs to achieve the function of the second ECU 1020. The SHE 1022 has an encryption processing function or the like. The SHE 1022 has a tamper-resistant property. The SHE 1022 is an example of a secure element. The SHE 1022 includes a storage media 1023 configured to store data. The main arithmetic unit 1021 uses the SHE 1022.

A vehicle information collection device 2000 receives or transmits data from or to the communication module 1051 of the TCU 1050 installed in the automobile 1001 through a communication line. That is, the vehicle information collection device 2000 receives or transmits data from or to the communication module 1051 through a wireless communication network accessible by the communication module 1051 of the TCU 1050 in the automobile 1001. Alternatively, the vehicle information collection device 2000 may receive or transmit data from or to the communication module 1051 through the wireless communication network and another communication network such as the Internet. For example, it is possible to connect the vehicle information collection device 2000 and the communication module 1051 through a private line such as a VPN (Virtual Private Network) line, thus implementing data reception/transmission through the private line. For example, it is possible to provide a private line such as a VPN line using a wireless communication network accessible by the SIM 1052. In this connection, it is possible to connect the vehicle information collection device 2000 and the automobile 1001 through a communication cable. For example, it is possible to connect the vehicle information collection device 2000 to the gateway 1070 of the automobile 1001 through a communication cable.

The vehicle information collection device 2000 collects logs of ECUs mounted on the automobile 1001. Herein, ECU logs are ECU-related records such as records of ECU operations, records of ECU accesses, and records of ECU communications.

Figure 2:
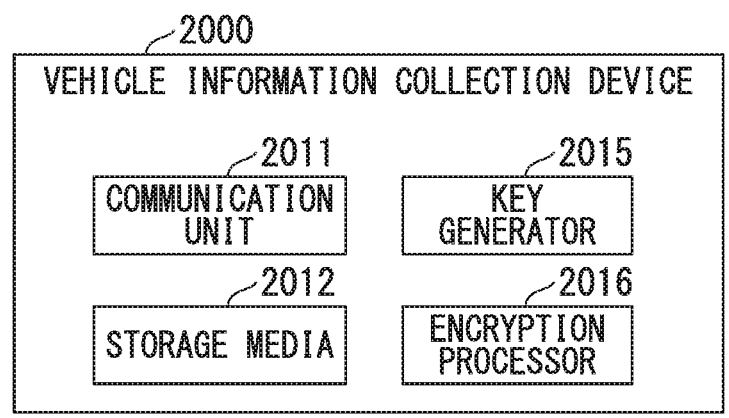
FIG. 2 is a block diagram showing a configuration of a vehicle information collection device according to one embodiment.

FIG. 2 is a block diagram showing a configuration example of the vehicle information collection device 2000. In FIG. 2, the vehicle information collection device 2000 includes a communication unit 2011, a storage media 2012, a key generator 2015, and an encryption processor 2016. The communication unit 2011 communicates with other communication devices through communication lines. The communication unit 2011 corresponds to a vehicle interface. The storage media 2012 stores data. The key generator 2015 generates keys.

The encryption processor 2016 carries out encryption processing. The encryption process of the encryption processor 2016 includes at least a verification process for verifying message authentication codes. The encryption processing of the encryption processor 2016 may further include an encrypting process for encrypting data and a decrypting process for decrypting encrypted data.

It is possible to achieve the function of the vehicle information collection device 2000 by executing computer programs with a CPU (Central Processing Unit) of the vehicle information collection device 2000. As the vehicle information collection device 2000, it is possible to use a general-purpose computer device or a special hardware device.

Figure 3:
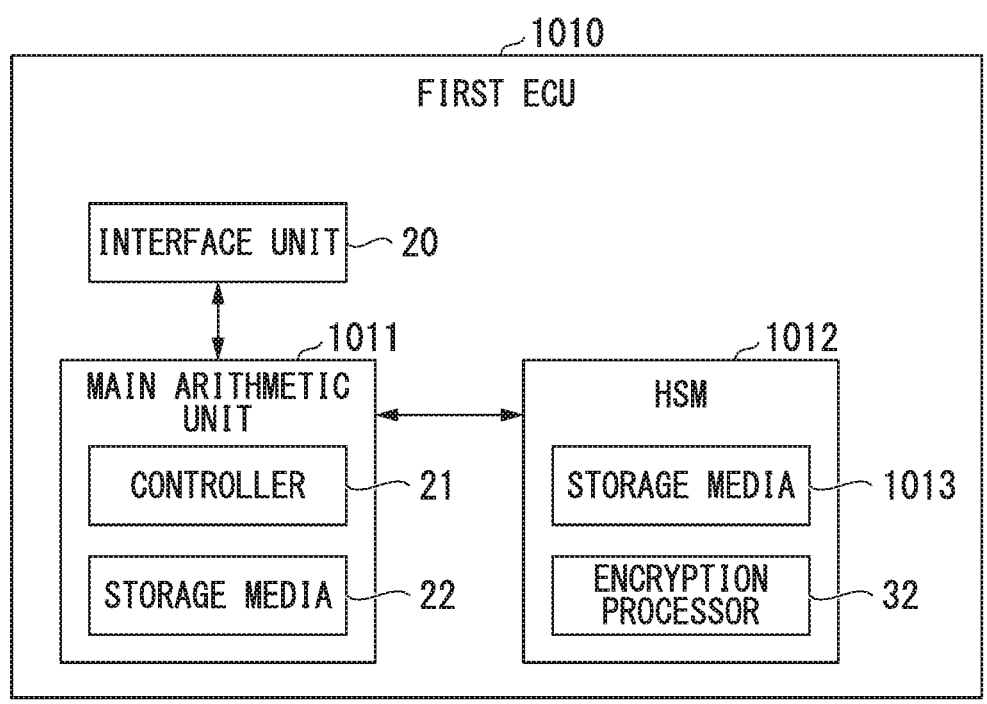
FIG. 3 is a block diagram showing a configuration of a first ECU according to one embodiment.

FIG. 3 is a block diagram showing a configuration example of the first ECU 1010. In FIG. 3, the first ECU 1010 includes a main arithmetic unit 1011, an HSM 1012, and an interface unit 20. The main arithmetic unit 2011 includes a controller 21 and a storage media 22. The HSM 1012 includes a storage media 1013 and an encryption processor 32.

The interface unit 20 receives or transmits data from or to an external device connectible to the first ECU 1010. The interface unit 20 includes an interface configured to receive or transmit data through the CAN 1030. The main arithmetic unit 1011 may receive or transmit data from or to a different device than the first ECU 1010 through the interface unit 20.

The controller 21 controls the first ECU 1010. The storage media 22 stores data. The storage media 1013 stores data. The encryption processor 32 carries out encryption processing. The encryption processing of the encryption processor 32 includes at least a generating process for generating message authentication codes. The encryption processing of the encryption processor 32 may further include an encrypting process for encrypting data and a decrypting process for decrypting encrypted data.

Figure 4:
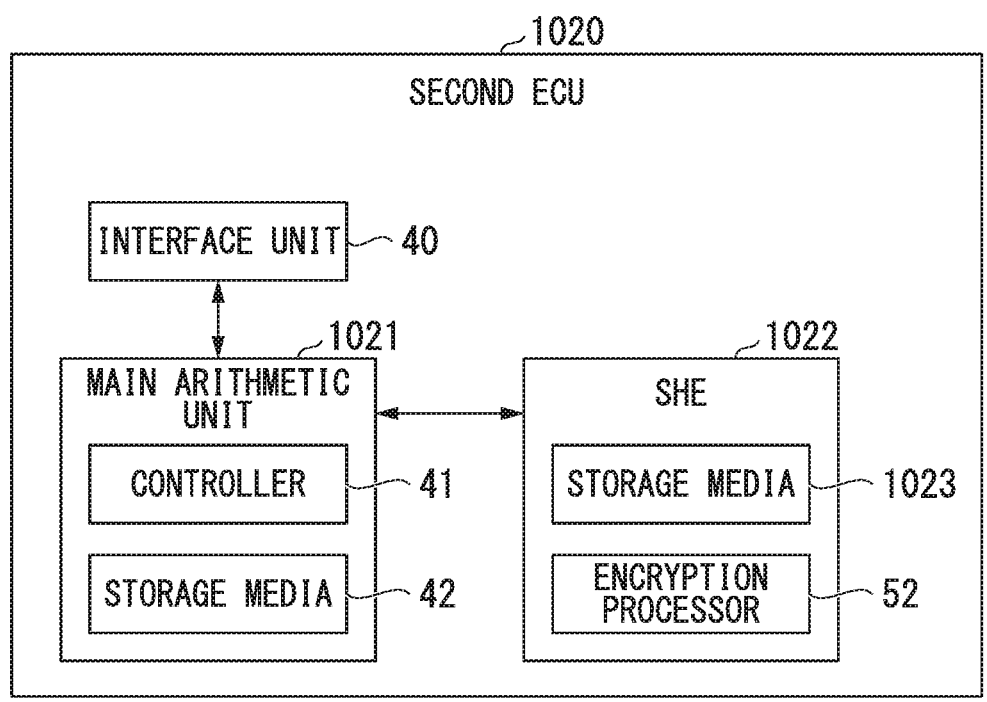
FIG. 4 is a block diagram showing a configuration of a second ECU according to one embodiment.

FIG. 4 is a block diagram showing a configuration example of the second ECU 1020. In FIG. 4, the second ECU 1020 includes a main arithmetic unit 1021, an SHE 1022, and an interface unit 40. The main arithmetic unit 1021 includes a controller 41 and a storage media 42. The SHE 1022 includes a storage media 1023 and an encryption processor 52.

The interface unit 40 receives or transmits data from or to an external device connectible to the second ECU 1020 including the interface unit 40. The interface unit 40 includes an interface configured to receive or transmit data through the CAN 1030. The main arithmetic unit 1021 receives or transmits data from or to other devices via the interface unit 40.

The controller 41 controls the second ECU 1020. The storage media 42 stores data. The storage media 1023 stores data. The encryption processor 52 carries out encryption processing. The encryption processing of the encryption processor 52 includes at least a generating process for generating message authentication codes. The encryption processing of the encryption processor 52 may further include an encrypting process for encrypting data and a decrypting process for decrypting encrypted data. For example, the details of an SHE are described in Non-Patent Literature Document 2.

Figure 5:
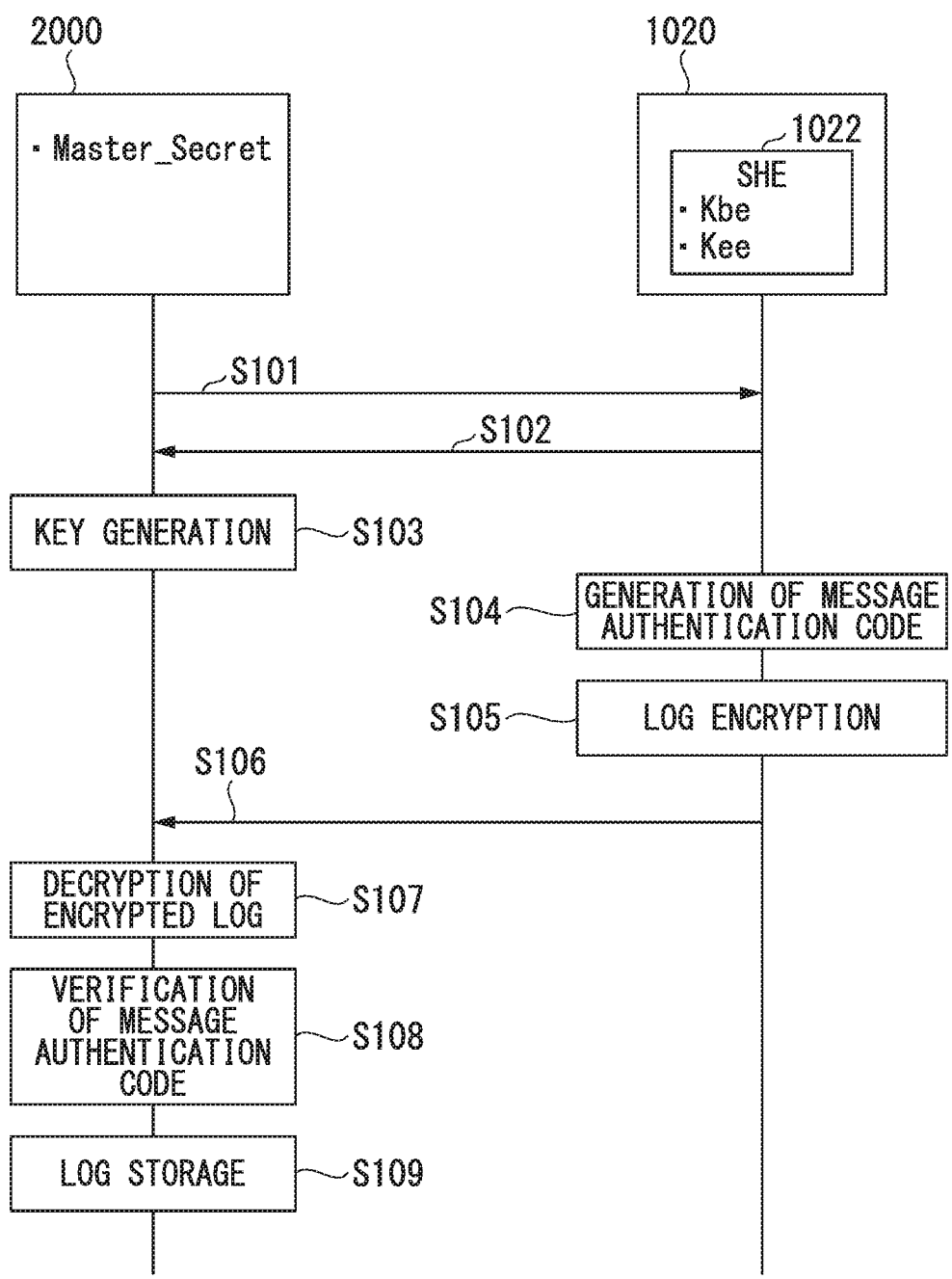
FIG. 5 is a sequence chart showing a vehicle information collection method according to one embodiment.

Next, an example of a vehicle information collection method according to the present embodiment will be described with reference to FIG. 5. FIG. 5 is a sequence chart showing an example of a vehicle information collection method according to the present embodiment. For the sake of illustration, FIG. 5 shows a single ECU, i.e. the second ECU 1020, alone among ECUs mounted on the automobile 1001. The following descriptions refer to an operation of collecting logs regarding a single second ECU 1020 mounted on the automobile 1001, however, this operation can be applied to other ECUs.

To apply the above operation to the first ECU 1010, the following description should be partially rephrased such that the interface unit 20 is substituted for the interface unit 40; the controller 21 is substituted for the controller 41; the storage media 22 is substituted for the storage media 42; the HSM 1012 is substituted for the SHE 1022; the storage media 1013 is substituted for the storage media 1023; the encryption processor 32 is substituted for the encryption processor 52.

The vehicle information collection device 2000 stores a master key Master_Secret on the storage media 2012 in advance. The second ECU 1020 stores a signature key Kbe and an encryption key Kee on the storage media 1023 of the SHE 1022 in advance.

Hereinafter, it is assumed that the vehicle information collection device 2000 communicates with the TCU 1050 of the automobile 1001 via the communication unit 2011, and therefore, the vehicle information collection device 2000 receives or transmits data from or to the second ECU 1020 connected to the CAN 1030 in the automobile 1001 through the gateway 1070. In this connection, it is possible to use an encrypted-communication channel as a communication channel established between the vehicle information collection device 2000 and the second ECU 1020. For example, it is possible to carry out a https (hypertext transfer protocol secure) communication as an example of an encrypted-communication channel established between the vehicle information collection device 2000 and the second ECU 1020.

(Step S101)

The vehicle information collection device 2000 transmits a log-collection request message to the second ECU 1020 of the automobile 1001 via the communication unit 2011. The second ECU 1020 of the automobile 1001 receives the log-collection request message transmitted thereto from the vehicle information collection device 2000 via the interface unit 40.

(Step S102)

Responsive to the log-collection request message from the vehicle information collection device 2000, the controller 41 of the second ECU 1020 sends back its own ECU identifier ECU_ID to the vehicle information collection device 2000 via the interface unit 40. The vehicle information collection device 2000 receives the ECU identifier ECU_ID transmitted thereto from the second ECU 1020 via the communication unit 2011.

(Step S103)

The key generator 2015 of the vehicle information collection device 2000 generates the signature key Kbe and the encryption key Kee for the second ECU 1020 using the ECU identifier ECU_ID from the second ECU 1020 of the automobile 1001.

An example of a key generation method of the key generator 2015 will be described below. The key generator 2015 generates a key (i.e. a common key) by the following equation using the master key Master_Secret stored on the storage media 2012, the ECU identifier ECU_ID of the second ECU 1020, and a variable Nk.

Common Key=Digest (Master_Secret, ECU_ID, Nk)

In the above, an expression of Digest (Master_Secret, ECU_ID, Nk) produces a digest value which is generated using the master key Master_Secret, the ECU identifier ECU_ID, and the variable Nk. As a digest value, for example, it is possible to mention a value calculated by a hash function or a value calculated by an exclusive-OR operation. For example, the common key is a hash-function value calculated based on input values such as such as the master key Master_Secret, the ECU identifier ECU_ID, and the variable Nk.

The digest value may differ due to a different value set to the variable Nk. By changing the variable Nk, it is possible to generate a different common key using the same master key Master_Secret and the same ECU identifier ECU_ID. In the following description, for example, Nk_a represents the variable Nk for a signature key while Nk_b represents the variable Nk for an encryption key. Accordingly, the key generator 2015 may generate different keys, i.e. the signature key Kbe and the encryption key Kee of the second ECU 1020, using the master key Master_Secret, the ECU identifier ECU_ID of the second ECU 1020, and the variables Nk_a and Nk_b.

Signature Key Kbe=Digest (Master_Secret, ECU_ID, Nk_a)

Encryption Key Kee=Digest (Master_Secret, ECU_ID, Nk_b)

The storage media 2012 stores the signature key Kbe and the encryption key Kee for the second ECU 1020. The storage media 1023 of the SHE 1022 of the second ECU 1020 stores the signature key Kbe and the encryption key Kee, which was generated according to the same method as the key generation method of the vehicle information collection device 2000, in advance.

According to another example of the key (common key) generation method of the present embodiment, it is possible to calculate a signature key using a hash function while calculating an encryption key using an exclusive-OR operation. Alternatively, it is possible to employ a reverse manner of calculations, i.e. it is possible to calculate a signature key using an exclusive-OR operation while calculating an encryption key using a hash function.

(Step S104)

The second ECU 1020 generates a message authentication code for its log. The log of the second ECU 1020 is generated by the controller 41 and stored on the storage media 42. As an example of a message authentication code, the present embodiment uses a CMAC (Cipher-based Message Authentication Code). The controller 41 of the second ECU 1020 transfers the log of the second ECU 1020 including the controller 41 to the SHE 1022 and thereby controls the SHE 1022 to calculate a CMAC for the log. The encryption processor 52 of the SHE 1022 calculates a CMAC for the log using the signature key Kbe stored on the storage media 1023. The SHE 1022 transfers the calculated CMAC to the controller 41.

(Step S105)

The second ECU 1020 encrypts its own log. The controller 41 of the second ECU 1020 transfers the log of the second ECU 1020 including the controller 41 to the SHE 1022 and thereby controls the SHE 1022 to generate an encrypted log corresponding to the encrypted data of the log. The encryption processor 52 of the SHE 1022 encrypts the log using the encryption key Kee stored on the storage media 1023 and thereby generates the encrypted log resulting from encryption. The SHE 1022 transfers the encrypted log to the controller 41.

(Step S106)

The controller 41 of the second ECU 1020 generates an encrypted log annotated with its message authentication code by adding a CMAC of the log of the second ECU 1020 to the encrypted log and thereby transmits the encrypted log to the vehicle information collection device 2000 via the interface unit 40. The vehicle information collection device 2000 receives the encrypted log annotated with its message authentication code transmitted thereto from the second ECU 1020 via the communication unit 2011.

(Step S107)

Using the encryption key Kee of the second ECU 1020 stored on the storage media 2012, the encryption processor 2016 of the vehicle information collection device 2000 decrypts the encrypted log annotated with its message authentication code from the second ECU 1020 of the automobile.

(Step S108)

Using the signature key Kbe of the second ECU 1020 stored on the storage media 2012, the encryption processor 2016 of the vehicle information collection device 2000 verifies a CMAC included in the encrypted log annotated with its message authentication code received from the second ECU 1020 of the automobile 1001. To verify the CMAC, the encryption processor 2016 calculates the CMAC using the signature key Kbe of the second ECU 1020 stored on the storage media 2012 with respect to the decrypted data resulting from decryption of the encrypted log in step S107. Next, the encryption processor 2016 compares the calculated CMAC with the CMAC included in the encrypted log annotated with its message authentication code. According to results of comparison, the encryption processor 2016 may successfully verify the message authentication code (CMAC) when those CMACs match each other, while the encryption processor 2016 may fail to verify the message authentication code (CMAC) when those CMACs do not match each other.

(Step S109)

When the encryption processor 2016 successfully verifies the message authentication code (CMAC), the storage media 2012 of the vehicle information collection device 2000 proceeds to store a log corresponding to the decrypted data produced by decrypting the encrypted log annotated with its message authentication code which successfully passes the verification of the message authentication code (CMAC). Accordingly, it is possible to save the log of the second ECU 1020 by the vehicle information collection device 2000.

When the encryption processor 2016 fails to verify the message authentication code (CMAC), the vehicle information collection device 2000 discards the encrypted log annotated with its message authentication code which fails to pass the verification of the message authentication code (CMAC), and therefore, the vehicle information collection device 200 may not save the decrypted data produced by decrypting the encrypted log annotated with its message authentication code. In this connection, when the encryption processor 2016 fails to verify the message authentication code (CMAC), the vehicle information collection device 2000 may carry out a predetermined error process. As an error process, for example, the vehicle information collection device 2000 may request the second ECU 1020 to retransmit its log. Alternatively, it is possible to repeat the error process until the message authentication code (CMAC) is successfully verified, wherein it is possible to repeat the error process a predetermined number of times.

According to the foregoing example of FIG. 5, the vehicle information collection device 2000 sends a log-collection request message to the second ECU 1020 and thereby collects the log of the second ECU 1020, however, it is possible for the second ECU 1020 to autonomously transmit its logs to the vehicle information collection device 2000. For example, it is possible for the second ECU 1020 to periodically transmit its logs to the vehicle information collection device 2000.

According to the foregoing example of FIG. 5, the second ECU 1020 is configured to encrypt its log and to thereby transmit the encrypted log to the vehicle information collection device 2000, however, it is possible to use the second ECU 1020 to directly send its log to the vehicle information collection device 2000 without decrypting it.

According to the foregoing example of FIG. 5, the second ECU 1020 generates a message authentication code (CMAC) for its log, however, it is possible for the second ECU 1020 to generate a message authentication code (CMAC) for its encrypted log using its own signature key Kbe. In this case, the encryption processor 2016 of the vehicle information collection device 2000 may calculate a CMAC using the signature key Kbe of the second ECU 1020 stored on the storage media 2012 with respect to the encrypted log annotated with its message authentication code. Next, the encryption processor 2016 compares the calculated CMAC with the CMAC included in the encrypted log annotated with its message authentication code. According to the results of calculation, the encryption processor 2016 may successfully verify the message authentication code (CMAC) when those CMACs match each other, while the encryption processor 2016 fails to verify the message authentication code (CMAC) when those CMACs do not match each other.

According to the foregoing embodiment, each of ECUs mounted on the automobile 1001 generates a message authentication code for its log using a signature key shared with the vehicle information collection device 2000 and thereby transmits the log annotated with its message authentication code to the vehicle information collection device 2000. Using the signature key of each ECU, the vehicle information collection device 2000 verifies the message authentication code annotated to the log received from each ECU of the automobile 1001. The vehicle information collection device 2000 saves the log annotated with the message authentication code which is successfully verified. Accordingly, it is possible to safely transfer logs between ECUs of the automobile 1001 and the vehicle information collection device 2000. According to the present embodiment, it is possible to obtain an effect of safely collecting logs of ECUs of the automobile 1001.

Heretofore, the embodiment of the present invention has been described in detail with reference to the drawings, however, detailed configurations are not necessarily limited to the embodiment; hence, the present invention may embrace any changes of design without departing from the essential matter of the invention.

The foregoing embodiment adopts an HSM or an SHE for an ECU, however, it is possible to use any encryption processing chips other than the HSM and the SHE. For example, it is possible to use an encryption processing chip called "TPM (Trusted Platform Module) f" for the first ECU 1010. The TPMf has a tamper-resistant property. The TPMf is an example of a secure element. For example, it is possible to use an encryption processing chip called "TPMt" for the second ECU 1020. The TPMt has a tamper-resistant property. The TPMt is an example of a secure element.

It is possible to use the foregoing embodiment achieving an operation to collect logs of in-vehicle devices such as the infotainment device 1040 and the gateway 1070 mounted on the automobile 1001. In this case, the infotainment device 1040 and the gateway 1070 are examples of in-vehicle computers mounted on the automobile 1001.

The foregoing embodiment refers to an automobile as an example of vehicles, however, the foregoing embodiment can be applied to other types of vehicles such as motorcycles and railcars.

In addition, it is possible to store computer programs to achieve the functions of the foregoing devices on computer-readable storage media, to load programs stored on storage media to computer systems, and to thereby execute programs. Herein, the term "computer system" may embrace OS and hardware such as peripheral devices.

The term "computer-readable storage media" may refer to flexible disks, magneto-optical disks, ROM, rewritable non-volatile memory such as flash memory, portable media such as DVD (Digital Versatile Disk), and storage devices such as hard disks embedded in computer systems.

In addition, the term "computer-readable storage media" may embrace any measures configured to hold programs for a certain period of time, such as volatile memory (e.g. DRAM (Dynamic Random Access Memory)) inside computer systems serving as servers or clients upon receiving programs transmitted through networks such as the Internet and communication lines such as telephone lines.

The aforementioned programs may be transmitted from computer systems including storage devices having stored programs to other computer systems through transmission media or through transmission waves propagating via transmission media. Herein, the term "transmission media" configured to transmit programs may refer to any media having functions to transmit information such as networks (communication networks) like the Internet and communication lines like telephone lines.

In addition, the aforementioned programs may achieve part of the foregoing functions.

Moreover, the aforementioned programs may be differential files (differential programs) which can be combined with pre-installed programs of computer systems to achieve the foregoing functions.

REFERENCE SIGNS LIST

22, 42, 2012: storage media
32, 52, 2016: encryption processor
20, 40: interface unit
21, 41: controller
1001: automobile
1002: in-vehicle computer system
1010: first ECU
1011, 1021: main arithmetic unit
1012: HSM
1013, 1023: storage media
1020: second ECU
1022: SHE
1030: CAN
1040: infotainment device
1050: TCU
1051: communication module
1052: SIM
1060: diagnosis port
1070: gateway
2000: vehicle information collection device
2011: communication unit
2015: key generator
2100: maintenance tool

The invention claimed is:

1. A vehicle information collection system, comprising:
a vehicle information collection device configured to collect a log representing a record about an operation of an in-vehicle computer mounted on a vehicle, wherein the in-vehicle computer further comprises an interface configured to communicate with the vehicle information collection device, and
an encryption processor configured to generate a message authentication code about the log of the in-vehicle computer using a signature key and to generate an encrypted log by encrypting the log using an encryption key, thus transmitting the encrypted log annotated with the message authentication code to the vehicle information collection device via the interface,
wherein the vehicle information collection device further comprises a vehicle interface configured to communicate with the in-vehicle computer to receive the encrypted log annotated with the message authentication code, a key generator configured to generate the signature key using a master key, an identifier of the in-vehicle computer, and a first value determined in advance and the encryption key using the master key, the identifier of the in-vehicle computer, and a second value determined in advance, an encryption processor configured to decrypt the encrypted log using the encryption key and to verify the message authentication code annotated to the encrypted log from the in-vehicle computer using the signature key, wherein the encryption processor is configured to generate a secondary message authentication code using the signature key with respect to the log decrypted from the encrypted log, and a storage media configured to store the log decrypted from the encrypted log when the message authentication code matches the secondary message authentication code.

2. A vehicle information collection device, comprising: a vehicle interface configured to communicate with an in-vehicle computer mounted on a vehicle to receive a message authentication code and an encrypted log produced by encrypting a log using an encryption key representing a record about an operation of the in-vehicle computer, and a processor configured to execute instructions stored on a memory, thus implementing:

generating a signature key using a master key, an identifier of the in-vehicle computer, and a first value determined in advance and the encryption key using the master key, the identifier of the in-vehicle computer, and a second value determined in advance;

decrypting the encrypted log from the in-vehicle computer using the encryption key and to verify the message authentication code annotated to the encrypted log from the in-vehicle computer using the signature key;

generating a secondary message authentication code using the signature key with respect to the log decrypted from the encrypted log; and storing the log decrypted from the encrypted log when the message authentication code matches the secondary message authentication code.

3. A vehicle information collection method adapted to a vehicle information collection device and an in-vehicle computer mounted on a vehicle, comprising:

generating by the in-vehicle computer a message authentication code about a log representing a record about an operation of the in-vehicle computer using a signature key;

generating an encrypted log by encrypting the log using an encryption key;

transmitting by the in-vehicle computer the encrypted log annotated with the message authentication code to the vehicle information collection device;

receiving by the vehicle information collection device the encrypted log annotated with the message authentication code from the in-vehicle computer;

generating by the vehicle information collection device the signature key using a master key, an identifier of the in-vehicle, and a first value determined in advance and the encryption key using the master key, the identifier of the in-vehicle computer, and a second value determined in advance;

decrypting by the vehicle collection device the encrypted log using the encryption key;

verifying by the vehicle collection device the message authentication code annotated to the encrypted log from the in-vehicle computer using the signature key;

generating a secondary message authentication code using the signature key with respect to the log decrypted from the encrypted log; and storing by the vehicle information collection device the log decrypted from the encrypted log when the message authentication code matches the secondary message authentication code on a storage media.

4. A non-transitory computer-readable storage medium having a stored computer program causing a computer to implement:

receiving an encrypted log annotated with a message authentication code from an in-vehicle computer mounted on a vehicle, wherein the encrypted log is produced by encrypting a log representing a record about an operation of the in-vehicle computer using an encryption key while the message authentication code is generated using a signature key with respect to the log of the in-vehicle computer;

generating the signature key using a master key, an identifier of the in-vehicle computer, and a first value determined in advance and the encryption key using the master key, the identifier of the in-vehicle computer, and a second value and determined in advance;

decrypting the encrypted log using the encryption key;

verifying the message authentication code annotated to the encrypted log from the in-vehicle computer using the signature key;

generating a secondary message authentication code using the signature key with respect to the log decrypted from the encrypted log; and storing the log decrypted from the encrypted log on a storage media when the message authentication code matches the secondary message authentication code.

* * * * *